United States Patent [19]
Flachsbarth et al.

[11] 3,754,165
[45] Aug. 21, 1973

[54] ELECTROMAGNETICALLY ACTUATED SWITCHING DEVICE HAVING DELAYED DROPOUT

[75] Inventors: Dieter Flachsbarth, Ruckersdorf; Hermann Schwarz, Henfenfeld, both of Germany

[73] Assignee: Siemens Aktiengesellschaft, Berlin, Germany

[22] Filed: Aug. 13, 1971

[21] Appl. No.: 171,614

[30] Foreign Application Priority Data
Aug. 29, 1970  Germany.................... P 20 43 010.8

[52] U.S. Cl............................. 317/141 S, 317/151
[51] Int. Cl. .......................................... H01h 47/18
[58] Field of Search..................... 317/141 R, 141 S, 317/151

[56] References Cited
UNITED STATES PATENTS

| 3,239,722 | 3/1966 | Menkis | 317/151 |
| 3,246,209 | 4/1966 | Multari et al. | 317/151 X |
| 3,582,716 | 6/1971 | Traina | 317/141 S |

*Primary Examiner*—J. D. Miller
*Assistant Examiner*—Harry E. Moose, Jr.
*Attorney*—Arthur E. Wilfond, Herbert L. Lerner et al.

[57] ABSTRACT

A series circuit arrangement of a polarized bistable relay and a capacitor is coupled to a voltage source via a diode. A switch is connected in parallel with the series circuit arrangement. A delay circuit connected to the voltage source and to the switch controls the switch and is energized upon failure of the voltage of the voltage source.

1 Claim, 1 Drawing Figure

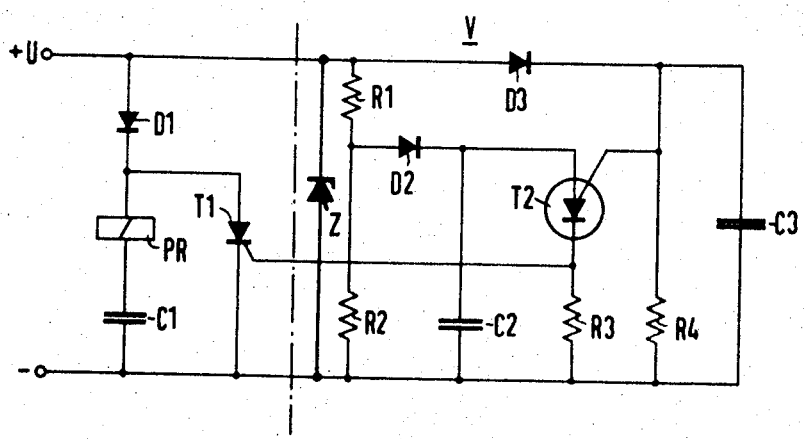

ELECTROMAGNETICALLY ACTUATED SWITCHING DEVICE HAVING DELAYED DROPOUT

The invention relates to an electromagnetically actuated switching device having delayed dropout. More particularly, the invention relates to an electromagnetically actuated switching device having delayed dropout and a capacitor.

Switching devices of the type of our invention are necessary for monitoring supply voltages, for example. In the event of a failure of supply voltage, a signal or switching command is released by the switching device. Switching devices having delayed dropouts are utilized to transmit a control signal only when a specific time has passed after the voltage failure, in order to prevent the release of a signal or the switchover to another voltage source in the event of a momentary voltage failure.

Relays or circuit breakers in which a capacitor is shunted across the control winding are utilized as switching devices having delayed dropout. The capacitor is charged by the supply voltage. After the failure of the supply voltage, the capacitor provides the holding voltage for the relay or circuit breaker. The voltage across the capacitor drops due to the discharge which occurs through the control winding, so that the relay drops out and releases a control signal when the voltage decreases below the holding voltage. In such a switching device, only disconnect times having inherently large tolerances may be obtained. This switching device is not suitable for control systems in which precise switching times are important. Furthermore, the aforedescribed switching device requires capacitors having large capacitance if long delay times are desired.

An object of our invention is to provide an electromagnetically actuated switching device having delayed dropout and a capacitor which overcomes the disadvantages of known similar devices.

Another object of our invention is to provide an electromagnetically actuated switching device having delayed dropout and a capacitor which provides a control signal at an accurately defined time after the failure of the supply voltage.

Still another object of the invention is to provide an electromagnetically actuated switching device having delayed dropout and a capacitor which requires only capacitors having small capacitances.

Another object of the invention is to provide an electromagnetically actuated switching device having delayed dropout and a capacitor, which device is of simple structure and functions with efficiency, effectiveness and reliability.

In accordance with the invention, an electromagnetically actuated switching device having delayed dropout comprises a first diode. A series circuit arrangement is coupled to a voltage source via the diode. The series circuit arrangement comprises a polarized bistable relay and a first capacitor connected in series. Switching means is connected in parallel with the series circuit arrangement. A delay circuit is connected to the voltage source and to the switching means and controls the switching means. The delay circuit is energized upon failure of the voltage of the voltage source.

The switching means has a control input, and the delay circuit comprises a parallel circuit coupled to the voltage source and having a voltage divider, a second diode and a second capacitor connected to the voltage divider via the second diode. The second diode is a discharge blocking diode. An RC circuit having a resistor and a third capacitor connected in parallel with each other is coupled to the voltage source via a third diode. The third diode is a decoupling diode. Control means responsive to a voltage difference in a direction-sensitive manner is connected between the second and third capacitors. The control means has a control output connected to the control input of the switching means. The delay circuit further comprises a cathode resistor. The control means of the delay circuit comprises a programmable unijunction transistor having an anode connected to the second capacitor, an anode grid connected to the third capacitor and a cathode connected to a terminal of the voltage source via the cathode resistor and to the control input of the switching means.

A Zener diode is connected in parallel with the delay circuit. The Zener diode permits the connection of the delay circuit to a supply voltage which is higher than the norminal voltage, although the delay circuit is designed for a nominal voltage corresponding to the Zener voltage.

The switching means comprises a semiconductor switching device such as, for example, a semiconductor controlled rectifier, silicon controlled rectifier, thyristor, or the like.

In order that the invention may be readily carried into effect, it will now be described with reference to the accompanying drawing, wherein the single FIGURE is a circuit diagram of an embodiment of the electromagnetically actuated switching device having delayed dropout of the invention.

In the FIGURE, a series circuit arrangement comprising a first capacitor C1 and a polarized bistable relay PR connected in series with each other is coupled to a DC voltage source U via a first diode D1. The first diode D1 is connected with its polarity in the conducting direction. A semiconductor switch T1, which may comprise, for example, a semiconductor controlled rectifier, a silicon controlled rectifier, a thyristor, or the like, is connected in parallel with the series circuit arrangement of the first capacitor and the relay.

The thyristor or silicon controlled rectifier T1 is controlled in operation by a delay circuit V. The delay circuit comprises a parallel circuit having a voltage divider R1, R2 and a second capacitor C2 coupled to a common point in the connection between the resistors R1 and R2 of said voltage divider via a second diode D2. The second diode D2 is a discharge-blocking diode. An RC circuit comprising a resistor R4 and a third capacitor C3 connected in parallel with each other, is coupled to the voltage source U via a third diode D3. The third diode D3 is a decoupling diode.

The delay circuit V further comprises a control device comprising a programmable unijunction transistor T2. The programmable unijunction transistor T2 has an anode connected to a common point in the connection between the second diode D2 and the second capacitor C2. The programmable unijunction transistor T2 has an anode grid connected to a common point in the connection between the third diode D3 and the RC circuit R4, C3. The programmable unijunction transistor T2 has a cathode connected to the negative polarity terminal of the DC voltage source U via a cathode resistor R3.

In order to balance and adjust the switching device of the invention, it is advisable to make the voltage divider R1, R2 and the resistor R4 adjustable or variable. The firing point of the programmable unijunction transistor T2 may be set by adjustment of the voltage divider R1, R2. The discharge time constant of the RC circuit R4, C3 may be varied by adjustment of the resistor R4. This permits simple balancing the simple adjustment by the aforedescribed adjustment.

If the switching device of the invention is connected to a DC voltage source, a current flows through the first diode D1 and the winding of the polarized bistable relay PR. This current energizes the relay PR and charges the first capacitor C1. At such time, the thyristor T1, which is connected in shunt with the relay PR and the first capacitor C1, is in its cutoff or nonconductive condition.

The second and third capacitors C2 and C3 of the delay circuit V are also charged by the current. Upon the termination of the charging process, a voltage determined by the resistance ratio of the voltage divider R1, R2 exists at the second capacitor C2. At such time, a voltage having a magnitude which practically corresponds to the voltage of the DC voltage source U exists at the third capacitor C3.

The third capacitor C3 is thus charged to a higher voltage than the second capacitor C2. The voltage at the anode grid of the programmable unijunction transistor T2, which is connected to the third capacitor C3, is thus also higher than the voltage at the anode of said transistor, which is connected to the second capacitor C2, so that said transistor is cut off or in its nonconductive condition.

In the event that there is no applied voltage, due to a failure in the line or the opening of a switch, the first and second capacitors cannot discharge, since the thyristor T1, on the one hand, is cut off and the second diode D2, on the other hand, is connected in the discharge circuit of the second capacitor C2 in the reverse direction. The third capacitor C3 of the RC circuit R4, C3 may, however, discharge via the resistor R4, so that the voltage across said third capacitor, and therefore the voltage at the anode grid of the programmable unijunction transistor T2, drops.

As soon as the voltage at the third capacitor C3 drops below the voltage prevailing at the second capacitor C2, and therefore the voltage at the anode of the programmable unijuncation transistor T2, said transistor is switched to its conductive condition and conducts. Thereupon, the second capacitor C2 discharges via the cathode resistor R3 and the thyristor T1 is fired, triggered, or switched to its conductive condition by the voltage drop across said cathode resistor resulting from the discharge current of said second capacitor. Then, when the thyristor T1 is in its conductive condition, the first capacitor C1 may discharge through the winding of the polarized bistable relay PR and said relay is switched to its other position by the discharge current of said first capacitor and provides a control signal via its contacts (not shown in the FIGURE).

The switching device of our invention may be connected to an AC voltage source as well as a DC voltage source. If a Zener diode Z is connected in parallel with the delay circuit V, as shown in the FIGURE, said delay circuit may be designed for a specific nominal voltage corresponding to the Zener voltage of said Zener diode and a special design corresponding to the supply voltage in each case becomes unnecessary.

A simple unijunction transistor may be utilized instead of the programmable unijunction transistor T2. The simple unijunction transistor may be connected with its base to base path in parallel with the RC circuit R4, C3 and with its emitter connected to the second capacitor C2. A disadvantage of the use of a simple unijunction transistor, however, is that the switching device does not then provide switching times as accurate as those provided by the circuit of the FIGURE.

A unijunction transistor is fully described in Chapter 13, pages 191 to 201 of the GE Transistor Manual, Sixth Edition, 1962, General Electric Company.

While the invention has been described by means of a specific example and in a specific embodiment, we do not wish to be limited thereto, for obvious modifications will occur to those skilled in the art without departing from the spirit and scope of the invention.

We claim:

1. An electromagnetically actuated switching device having delayed dropout, said switching device comprising a first diode; a series circuit arrangement coupled to a voltage source via the diode, said series circuit arrangement comprising a polarized bistable relay and a first capacitor connected in series; switching means connected in parallel with the series circuit arrangement; and a delay circuit connected to the voltage source and to the switching means for controlling said switching means, said delay circuit being energized upon failure of the voltage of the voltage source, said switching means having a control input, and said delay circuit comprising a parallel circuit coupled to the voltage source and having a voltage divide having a tap, a second diode and a second capacitor connected to the tap of the voltage divider via the second diode, the second diode being a discharge-blocking diode, and an RC circuit having a resistor and a third capacitor connected in parallel with each other, and said switching means comprising a thyristor having a control electrode, a cathode resistor and a programmable unijunction transistor having an anode connected to the second capacitor, an anode grid connected to the third capacitor and a cathode connected to one polarity terminal of the voltage source via the cathode resistor and directly connected to the control electrode of the thyristor.

* * * * *